Oct. 29, 1968           C. T. SPEAR           3,407,412
DEVICE FOR SUPPLYING CHEMICAL DISINFECTANT AND THE LIKE TO
THE TRAP OF A TOILET BOWL
Filed June 9, 1966
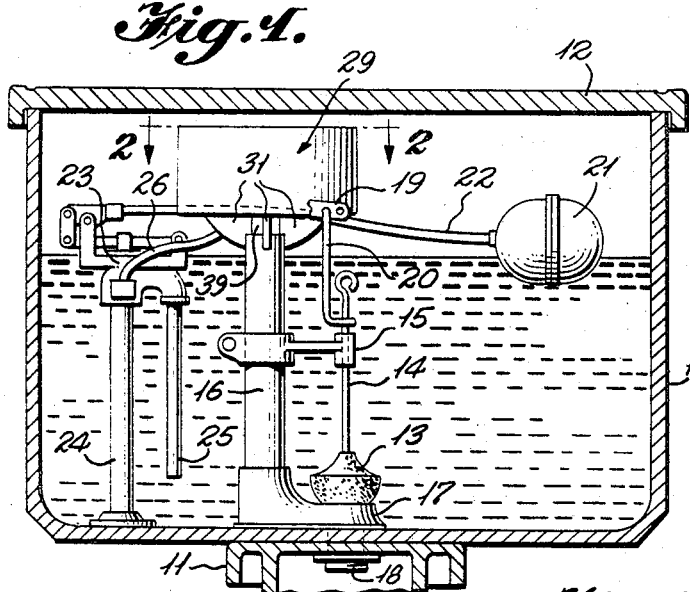
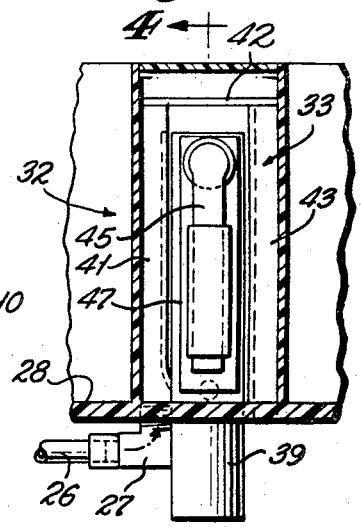
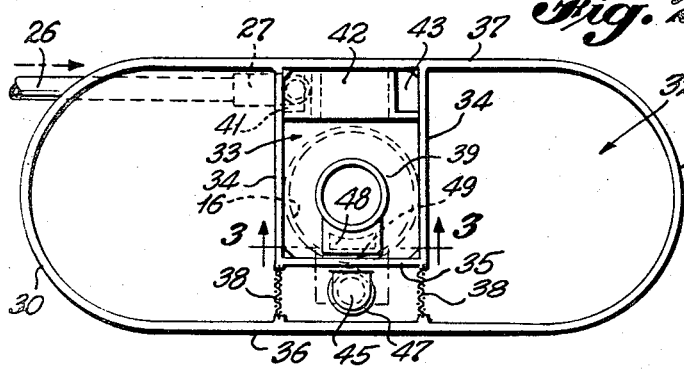
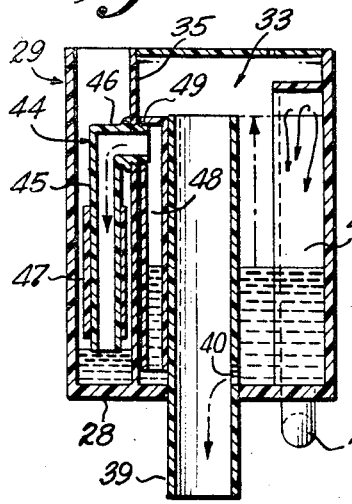
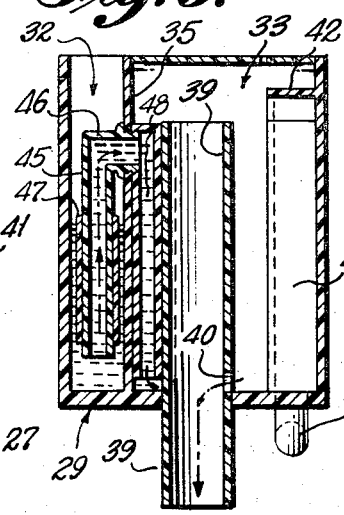
INVENTOR.
Clifton T. Spear
BY
B. P. Fishburn, Jr.
ATTORNEY ates Patent Office 3,407,412
Patented Oct. 29, 1968

3,407,412
DEVICE FOR SUPPLYING CHEMICAL DISINFECTANT AND THE LIKE TO THE TRAP OF A TOILET BOWL
Clifton T. Spear, c/o The Diamond Spear Co., Texarkana, Tex. 75501
Filed June 9, 1966, Ser. No. 556,374
15 Claims. (Cl. 4—228)

The present invention relates to a device for automatically supplying a chemical disinfectant, deodorizer or the like to the trap of a toilet bowl after completion of the normal flushing cycle.

More specifically, the invention, by a unique mode of operation, gently supplies a limited amount of water to a chemical mixing chamber during the flushing cycle, and then by a reverse syphoning action, after the flushing cycle is completed and the float-operated water inlet valve is closed, supplies the chemical in full concentrated strength and predetermined quantity to the bowl trap, without the loss of chemical in the flushing water or in the water of the flush tank. The invention is particularly applicable to the most common types of toilet fixtures which employ the usual bowl or stool having a trap, in conjunction with an elevated flush tank having a manually unseated ball valve and a float-operated refill mechanism.

Numerous attempts have been made in the prior art to supply chemical disinfectants and the like to toilet bowls, during or after the flushing cycle. Some of these prior art devices employ valves and springs and other mechanical parts which are complex and costly and one such example is shown in United States Patent 2,761,151, Ferrando.

A common failing of the prior art resides in the failure to realize the rather large amount of water which passes through the small refill tube or bypass tube commonly extending between the water inlet and overflow pipes of the flush tank during the flushing operation. The main purpose of this refill tube is to assure that the bowl trap is refilled with water prior to the next flush. However, in practice, the refill tube supplies significantly more water to the trap than is required to fill it, with the result that any chemical or the like supplied to the trap prior to the closing of the water inlet valve in the tank is generally washed out of the trap and lost down the sewer. Most of the prior art schemes dealing with the problem have completely lost sight of this problem. Examples are United States Patents 3,084,350, Anderson; 3,001,210, Diehl; and 2,853,715, Ratcliffe.

The prior art contains one approach to the present invention, namely, the device in United States Patent 2,479,842, Kirwan. In this patent, during the flushing cycle, a portion of the incoming refill water is diverted directly into a chemical container under full water pressure. A portion of the pressurized water coming into the container is diverted through a tube into the conventional overflow pipe of the flush tank. The chemical container has a vent port. Under actual testing, the device of the Kirwan patent has been found to contain serious objections and deficiencies and does not operate reliably in the intended manner. In the first place, a significant portion of the water entering the chemical container under full water pressure is blown out through the vent port and is lost with an appreciable amount of the chemical in the container. Secondly, when the flushing cycle is completed, the intended syphoning action for drawing chemical from the container into the overflow pipe is unreliable, apparently due to extreme turbulence caused by the fact that full water pressure is being supplied from the inlet valve, through the tube leading to the chemical container. Apparently, the necessary vacuum to initiate the syphoning action is not present in all cases, causing the device to misfunction.

It is the primary object of the present invention to overcome the difficulties in the Kirwan device, as well as all of the aforementioned difficulties of the prior art. This is accomplished with the invention in a very simplified system having no moving mechanical parts, and wherein a controlled amount of water is introduced gently into the chemical container, which utilizes a solid chemical, substantially without turbulence. A complete hydrostatic seal is obtained in the system after filling of the chemical chamber or container, and after a predetermined time delay interval during which the water inlet valve is closed, the chemical mixture is efficiently and gently reversely syphoned from the chemical chamber and metered through the overflow pipe into the toilet bowl trap in full strength and without any loss of chemical whatsoever. This mode of operation and the simplified structure of the invention which renders it possible has never before been achieved by the prior art.

Another object of the invention is to provide a chemical metering attachment of the above-mentioned character which may be bodily mounted upon the top of the overflow pipe and which consists essentially of an auxiliary container or tank having a relatively small control chamber, a relatively large chemical mixing chamber and a novel inverted-U syphoning device interconnecting said chambers in a unique manner.

Still another object of the invention is to provide a device of the above-mentioned character which is economical to manufacture from plastics or the like, highly reliable and efficient in operation, resulting in a great saving of chemical, deodorant or disinfectant, over a period of time, and easy to install and maintain.

Other objects and advantages of the invention will become apparent during the course of the following detailed description.

In the accompanying drawings forming a part of this application and in which like numerals are employed to designate like parts throughout the same.

FIGURE 1 is a fragmentary vertical section through a toilet flush tank and mechanism equipped with the invention attachment;

FIGURE 2 is an enlarged plan view of the invention taken on line 2—2 of FIGURE 1;

FIGURE 3 is an enlarged fragmentary vertical section taken substantially on line 3—3 of FIGURE 2;

FIGURE 4 is a vertical sectional view taken substantially on line 4—4 of FIGURE 3 and illustrating one condition of operation of the invention; and FIGURES 5 and 6 are sectional views similar to FIGURE 4 illustrating second and third conditions of operation of the invention device.

In the drawings, wherein for the purpose of illustration is shown a preferred embodiment of the invention, attention is directed first to FIGURE 1, wherein the numeral 10 designates the usual toilet flush tank mounted upon an extension 11 of the toilet bowl or stool or upon an independent support, in some instances. The tank 10 customarily has a removable cover 12, as shown. The conventional flush mechanism within the tank 10 includes the usual manually elevated ball valve 13 whose vertical stem 14 is guided by a short sleeve 15 mounted upon the adjacent upright overflow pipe 16 whose open top assures that the water level within the tank cannot rise above a predetermined maximum point. The lower end of the overflow pipe 16 communicates with a chambered seat 17 for the ball valve 13, said seat communicating directly with the outlet flush pipe 18 coupled with the toilet bowl, not shown. As is well known, when it is desired to flush the toilet, the ball valve 13 is unseated by manipulating a handle on the exterior of the flush tank, not shown, said handle connected with a lever 19, in turn connected with a link 20 which is capable of lifting the stem 14 of the ball valve.

When the ball valve 13 is thus unseated, the water in the tank 10 rushes by gravity through the pipe 18 to flush out the toilet bowl. When this occurs, the usual float 21 within the tank carried by a float arm 22 causes opening of a water inlet valve 23 mounted atop an upstanding water inlet pipe 24 connected in and leading through the bottom wall of the tank 10. The incoming water to refill the tank 10 is directed downwardly toward the bottom of the tank by a depending inlet pipe extension 25. This arrangement reduces turbulence.

The ball valve 13 is reseated automatically after the flushing water drains from the tank 10, and the float 21 begins to rise slowly as the tank refills itself. The valve 23 remains open until the water level in the tank 10 reaches a predetermined level regulated by the float 21, usually slightly below the top of overflow pipe 16. When this desired level is achieved, the float 21 causes the inlet valve 23 to close and the entire flushing and refilling cycle is completed.

It will be noted in connection with the present invention that the customary bypass or refill tube leading from the inlet valve 23 to the top of the overflow pipe 16 is not employed in its usual form. Instead, a bypass tube 26 leads from the inlet valve 23 to an elbow fitting 27 which is connected directly into the bottom wall 28 of the invention container or tank 29, now to be described in detail.

The container or tank 29 is a relatively small container compared to the flush tank 10, FIGURE 1, and is somewhat elongated as shown, including rounded end walls 30 and straight side walls, the aforementioned bottom wall 28 being flat. The entire invention container 29 rests bodily and removably upon the top of the overflow pipe 16 and is held thereon frictionally by preferably four notched fingers or lugs 31 which snugly embrace the top of the pipe. Other attaching means may be employed if preferred.

The tank or container 29 is divided internally into a relatively large chemical mixing chamber 32 and a relatively small control chamber 33. The two chambers share the common bottom wall 28, but the smaller control chamber 33 is bounded by side walls 34 and an end wall 35, FIGURE 2, the latter spaced from the adjacent main side wall 36. The opposite main side wall 37 serves to close the other end of the control chamber 33. If desired, to assure that the syphoning mechanism will never become clogged with solid particles, filtering screens 38 may be placed across the relatively narrow portion of the chemical chamber 32 with their ends anchored between the walls 35 and 36, as best shown in FIGURE 2.

Centrally of the container or tank 29 is an integral relatively large overflow pipe extension 39 which extends to a point near and below the top of the container 29 and to a point below the bottom wall 28 thereof. In assembly, the overflow pipe 39 projects into the top of the main overflow pipe 16 in the flush tank 10 so as to communicate directly therewith. The overflow pipe 39 is located substantially centrally within the relatively small control chamber 33 and has a small opening 40 adjacent to the bottom wall 28 which constitutes an important feature of the invention, to be described in further detail. Suffice it to say now that the liquid contents of the chamber 33 must drain slowly through the opening 40 upon entering the pipe 39 and the main pipe 16 leading eventually to the trap in the toilet bowl.

It may now also be seen that the aforementioned elbow fitting 27 communicates directly with the bottom of the control chamber 33 so that water from the bypass tube 26 during the flushing and refilling cycle is conveyed directly to the chamber 33 rather than to the overflow pipe 16, as is the conventional practice. The elbow fitting 27 leads to a vertical molded water inlet conduit 41 within the chamber 33 at one corner thereof, FIGURE 2, the top of this conduit being open at the same elevation as the top of the overflow pipe 39. Preferably, although not necessarily, a spray deflector baffle 42 is placed somewhat above the open top of the inlet conduit 41 to further quiet turbulence. At the other outer corner of control chamber 33, an auxaliary overflow conduit 43 has its top opening through the baffle 42 and its bottom opening through the bottom wall 28 of tank 29. Consequently, whenever excessively high city water pressure may be encountered, such that the normal capacity of the overflow pipe 39 is exceeded, water may drain through the auxiliary overflow conduit 43 and pass back into the flush tank 10.

The two chambers 32 and 33 are connected by a two-part inverted U-shaped syphoning member or means 44 including a first vertical syphoning leg 45 within the chamber 32, between the two screens 38 and having a short top horizontal portion 46 connected within the divider wall 35 in any suitable manner. The syphoning leg 45 may carry a slidable adjusting extension or sleeve 47 thereon so that the length of the leg 45 may be adjusted as desired to regulate the amount of chemical residue remaining in the chamber 32 after a given cycle.

The syphoning device 44 includes a second leg 48 disposed between the overflow pipe 39 and divider wall 35 and preferably conforming to the cylindrical shape of the pipe 39 as shown in FIGURE 2. Near its top, the syphoning leg 48 has a screw-threaded connection as at 49 with the horizontal portion 46. Hence, the two syphoning legs 45 and 48 are on opposite sides of the divider wall 35. As shown, the leg 48 is somewhat longer than the leg 45 and extends near the bottom of the control chamber 33. It will be noted in the drawings that the top of overflow tube 39 is positioned slightly above the top branch 46 of the U-shaped syphoning tube or conduit.

The operation of the invention is as follows:

Assume that the user flushes the toilet by unseating the ball valve 13. When this occurs, the full tank 10 will discharge its contents through the pipe 18 into the toilet bowl not shown. When the tank 10 empties itself so that the ball valve 13 cannot float, it automatically descends and reseats itself on the seat 17 so that no further water from the tank can pass to the toilet bowl. However, liquid can pass to the toilet bowl trap at any time through the overflow pipe 16 which leads to a chamber of the seat 17, always in communication with the pipe 18.

When the toilet is thus flushed, and immediately upon lowering of the water level within the tank 10, the resultant lowering of the float 21 opens the water inlet valve 23 and begins the refilling of the tank, even before all of the water has rushed from the tank through the relatively large pipe 18. As soon as the valve 23 opens, and it will remain open until the tank 10 is entirely refilled, some incoming water begins to flow through the bypass tube 26 and through the elbow 27 to the bottom of the control chamber 33 and the filling of this control chamber 33 gradually is illustrated in FIGURE 4 of the drawings. When the control chamber 33 is filled to the level of the top of overflow pipe 39 and while the flushing and refilling cycle of the toilet is still in process, the same water rising in the syphoning leg 48 will begin to flow through the top branch 46 and down the leg 45 to gradually fill the relatively larger chemical chamber 32 which contains preferably a mass of solid chemical, disinfectant, deodorant or the like. This filling action of the chamber 32 will continue while some of the water passes through the overflow pipe 39 and into the main overflow pipe 16. It is to be noted that the arrangement for filling the chamber 32 allows the water to flow gently through the syphoning leg 45 into the chemical chamber and without direct pressure and consequently without turbulence causing splashing of the chemical from the top of the chamber 32 with resultant loss thereof. In other words, it is a gentle overflowing or spilling action through the inverted U-shaped syphoning tube which gradually fills the chemical mixing chamber 32 so that the chemical can gradually dissolve in the water and achieve the desired strength.

All the while, water is flowing slowly from the control chamber 33 through the small port 40 back into the overflow tube 39. When the tank 10 is finally filled to its proper level, and the float 21 closes the inlet valve 23, the water in the control chamber 33 will gradually drain through the port 40 into the pipe 39 and this condition is illustrated in FIGURE 5 of the drawings. When all of the water has drained from the control chamber 33, the unique reverse syphoning action of the invention will be initiated, as shown in FIGURE 5, and the contents of the chemical chamber 32 will be syphoned upwardly through the leg 45 and downwardly through the leg 48 quietly and gradually into the chamber 33 and then out through the port 40 into the overflow pipe 39 and consequently into the pipes 16 and 18 and finally to the trap of the toilet bowl to fill such trap. This syphoning action will continue until the chamber 32 is substantially empty down to the level of the bottom of the syphoning leg 45 which is adjustable, as previously stated.

In this manner, the chemical from the chamber 32 is metered directly into the bowl trap without the loss of any chemical, either from the top of the chamber 32 during filling thereof or out through the bowl trap itself as would be the case if an excessive amount of chemical were supplied to the trap.

Applicant's structure achieves a number of advantages over the prior art including, notably, the Kirwan patent, 2,479,842, aforementioned. Firstly, the water entering the mixing chamber 32 enters in a slow and gentle manner without turbulence, splashing or spraying. Secondly, when the chamber 32 is filled to the extent controlled by the top of the pipe 39, hydrostatic pressure seals the chamber 32 until such time as all of the fluid in the control chamber 33 has drained out gradually through the port 40. This gradual draining provides an additional time delay interval in the invention to assure that the valve 23 has finally closed before the metering of the chemical from the chamber 32 into the trap of the toilet bowl commences. When it does commence, all of the chemical in the chamber 32 will be directed into the toilet bowl trap by a very positive and reliable and unfailing syphoning action through the syphoning legs 45 and 48, again without turbulence or bubbling or loss of vacuum, as sometimes occurs with the Kirwan structure due to positive pressure in the tubes leading to and from the chemical chamber of that patent.

FIGURE 6 of the drawings illustrates the condition of the apparatus when substantially all of the chemical has been withdrawn from the chamber 32 and supplied to the trap of the bowl after completion of the flushing cycle and after the valve 23 is fully closed. The entire tank or container 29 is now substantially empty except for a small residue in the chamber 32 and the control chamber 33 is ready for refilling in the manner described from the bypass tube 26 at the beginning of the next flushing cycle.

The invention has no moving parts, springs, floats, levers or the like and it is self-cycling and repeating in operation substantially indefinitely. Occasionally, it is necessary to add new solid chemical to the chamber 32.

The top of the chamber 33 may be optionally provided with a cover 50 having a small vent opening. Also, if desired, the entire tank 29 may have a removable cover, not shown, and this may be placed over the cover 50.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An apparatus for placing a chemical disinfectant or the like in the trap of a toilet bowl after completion of the flush cycle and closing of the float-operated water inlet valve in the flush tank, said apparatus comprising a container mountable within the flush tank, said container being compartmented and having a relatively small control chamber and a relatively large chemical chamber, an overflow pipe section on the container projecting into the control chamber and also projecting into the overflow pipe of the flush tank, said overflow pipe section having a small opening near the bottom of the control chamber so that liquid may drain gradually from the control chamber, liquid inlet means leading into the control chamber and connected with the inlet means of the flush tank, and a syphoning device interconnecting said control and chemical chambers and including a syphoning leg in each chamber, said syphoning device operable first to fill the chemical chamber after liquid rises within the control chamber and then to drain the chemical chamber by syphoning after the liquid in the control chamber drains into the overflow pipe section through said small opening.

2. The invention as defined by claim 1, and wherein said syphoning device is inverted U-shaped and formed in two sections, one section thereof connected in a divider wall between said chambers and the other section connected with said one section near one side of the divider wall.

3. The invention as defined by claim 1, and wherein the syphoning leg within the chemical chamber is longitudinally extensible to regulate the quantity of residue remaining in the chemical chamber after syphoning.

4. The invention as defined by claim 1, and wherein said liquid inlet means leading into the control chamber includes tubular fitting connected in the bottom wall of the control chamber, a tube connected with said fitting and leading to the flush tank inlet valve, and an upstanding conduit in the control chamber leading from the fitting to a point near the top of the control chamber.

5. The invention as defined in claim 4, and an auxiliary overflow conduit in the control chamber and opening through the bottom thereof.

6. The invention as defined by claim 1, and means on the bottom wall of said container engageable with the top of the flush tank overflow pipe to bodily support the container thereon.

7. The invention as defined by claim 6, and wherein said means on the bottom wall of said container includes a plurality of recessed lug elements which engage over the upper end of the flush tank overflow pipe and including shoulders resting on said upper end.

8. The invention as defined by claim 1, and wherein the overflow pipe section is mounted directly in the bottom wall of the control chamber and extends above and below the bottom wall with said small opening adjacent the bottom wall.

9. Apparatus for supplying a chemical disinfectant or deodorizer to a toilet bowl trap comprising a container adapted to be mounted upon the top of a toilet flush tank overflow pipe, means dividing said container into a relatively small control chamber and a relatively large chemical mixing chamber, an overflow pipe in the control chamber extending near the top thereof and extending below the bottom wall of the control chamber and into the overflow pipe of the flush tank and communicating with the latter, there being a restricted opening in the overflow pipe of the control chamber adjacent the bottom wall of the control chamber so that liquid can gradually drain therefrom into the overflow pipe, a bypass tube communicating with the bottom of the control chamber and adapted for connection with water inlet means of the flush tank, and an inverted U-shaped syphoning device including one substantially vertical syphoning leg disposed within said control chamber and another syphoning leg disposed within said chemical mixing chamber, whereby the chemical mixing chamber is filled with water through said syphoning device gently and without turbulence during the flushing cycle, followed by gradual draining of water from the control chamber through said restricted opening, followed by quiet syphoning of the mixture from the chemical mixing chamber through the syphoning device and into the control chamber and overflow pipe after closing of the water inlet means of said flush tank.

10. The invention as defined by claim 9, and a vertical water inlet conduit within the control chamber communicating with said bypass tube at the bottom wall of the control chamber and discharging water into the top portion of the control chamber substantially at the elevation of said overflow pipe of the control chamber.

11. The invention as defined by claim 9, and wherein the inverted U-shaped syphoning device is a two-section device with one section connected into the divider wall between the control chamber and chemical mixing chamber and the other section positively connected with said one section near one side of the divider wall.

12. The invention as defined by claim 9, and wherein the syphoning leg within the control chamber is somewhat longer than the syphoning leg within the chemical mixing chamber.

13. The invention as defined by claim 9, and wherein the syphoning leg within the chemical mixing chamber is longitudinally adjustable to regulate the amount of residue left within the chemical mixing chamber.

14. The invention as defined by claim 9, and wherein the chemical mixing chamber has a narrow portion adjacent one end of the control chamber, the leg of the syphoning device within the chemical mixing chamber being disposed at said narrow portion, and filter screens extending across said narrow portion on opposite sides of said syphoning leg to protect the same from particulate matter.

15. A device for placing chemical disinfectant or the like in the trap of a toilet bowl with economy of chemical material comprising a two compartment container mountable upon the top of a flush tank overflow pipe, one of said compartments being a relatively small control compartment and the other compartment being a relatively large chemical mixing compartment, an overflow pipe in said control compartment having a small drain opening near the bottom of the control compartment, a water inlet means in the bottom of the control compartment, and an inverted U-shaped syphoning member connected in the wall separating said control and mixing compartments and having a first syphoning leg in the mixing compartment and a separate syphoning leg in the control compartment near the bottom of the latter, said inverted U-shaped syphoning member utilized first to fill the mixing compartment with water rising in the control compartment and to subsequently syphon liquid from the mixing compartment into the control compartment subsequent to the full draining of the control compartment through said small opening and into the overflow pipe.

References Cited
UNITED STATES PATENTS

| 1,170,387 | 2/1916 | Andrews | 4—227 |
| 2,479,842 | 8/1949 | Kirwan | 4—224 |

FOREIGN PATENTS

| 933,496 | 1/1948 | France. | |

LAVERNE D. GEIGER, *Primary Examiner.*

HAROLD J. GROSS, *Assistant Examiner.*